(12) United States Patent
Rabaioli et al.

(10) Patent No.: US 11,814,525 B2
(45) Date of Patent: Nov. 14, 2023

(54) HYDROPHOBIC SURFACE MODIFIED ALUMINAS FOR POLYMER COMPOSITIONS AND METHOD FOR MAKING THEREOF

(71) Applicant: Sasol (USA) Corporation, Houston, TX (US)

(72) Inventors: Maria Roberta Rabaioli, Westlake, LA (US); Ryan Loscutova, Houston, TX (US)

(*) Notice: Subject to any disclaimer, the term of this patent is extended or adjusted under 35 U.S.C. 154(b) by 102 days.

(21) Appl. No.: 17/366,514

(22) Filed: Jul. 2, 2021

(65) Prior Publication Data

US 2021/0403721 A1    Dec. 30, 2021

Related U.S. Application Data

(62) Division of application No. 15/767,549, filed as application No. PCT/US2016/059294 on Oct. 28, 2016, now Pat. No. 11,091,648.

(Continued)

(51) Int. Cl.
*C09C 1/40*    (2006.01)
*C01F 7/021*   (2022.01)
(Continued)

(52) U.S. Cl.
CPC ............ *C09C 1/407* (2013.01); *C01F 7/021* (2013.01); *C08K 3/22* (2013.01); *C08K 9/04* (2013.01);
(Continued)

(58) Field of Classification Search
CPC .......... C09C 1/407; C01F 7/021; C08K 3/22; C08K 9/04
See application file for complete search history.

(56) References Cited

U.S. PATENT DOCUMENTS 7,312,258 B2    12/2007    Hoppler et al.
7,371,425 B2     5/2008    Rathenow et al.
(Continued)

FOREIGN PATENT DOCUMENTS

JP    57115434      7/1982
JP    2009227485   10/2009
WO    2010111279    9/2010

OTHER PUBLICATIONS

Duncan, Timothy V., Applications of nanotechnology in food packaging and food materials; Barrier materials, antimicrobials and sensors, J. of Colloid and Interface Science, 363 (2011) p. 1-24.

(Continued)

*Primary Examiner* — James A Fiorito
(74) *Attorney, Agent, or Firm* — Bushman Werner, P.C.

(57) ABSTRACT

A method of producing new hydrophobic aluminas by
  i) providing a slurry comprising an alumina compound, the slurry having a pH of above 5.5;
  ii) mixing an organic composition comprising carboxylic acids with long hydrocarbon chains with the slurry to form an acid modified slurry;
  iii) hydrothermally conditioning the acid modified slurry to form a hydrothermally aged slurry; and
  iv) drying the hydrothermally aged slurry.

The new hydrophobic aluminas have surface modified structures distinguished by a low humidity content and very small nanoparticles. These new hydrophobic aluminas can be uniformly dispersed in a substrate, for example polymers.

9 Claims, 6 Drawing Sheets

Related U.S. Application Data

(60) Provisional application No. 62/248,962, filed on Oct. 30, 2015.

(51) Int. Cl.
  *C08K 9/04* (2006.01)
  *C08K 3/22* (2006.01)

(52) U.S. Cl.
  CPC ...... *C01P 2002/82* (2013.01); *C01P 2002/88* (2013.01); *C01P 2004/03* (2013.01); *C01P 2004/62* (2013.01); *C01P 2004/64* (2013.01); *C08K 2003/2227* (2013.01); *C08K 2201/005* (2013.01)

(56) References Cited

U.S. PATENT DOCUMENTS

| | | |
|---|---|---|
| 8,575,255 B2 | 11/2013 | Yener et al. |
| 2007/0098990 A1 | 5/2007 | Cook et al. |
| 2008/0317794 A1 | 12/2008 | Gellermann et al. |
| 2009/0136744 A1 | 5/2009 | Yener et al. |
| 2012/0114881 A1 | 5/2012 | Guiselin et al. |
| 2013/0245173 A1 | 9/2013 | Welker et al. |
| 2016/0102109 A1 | 4/2016 | Maeda |

OTHER PUBLICATIONS

Sanchez-Garcia, M.D., Novel PET nanocomposites of interest in food packaging applications and comparative barrier performance with biopolyester nanocomposites, J. of Plastic Film and Sheeting, vol. 23 (2007).

Dintcheva, et al., Effect of extrusion and photo-oxidation on polyethylene / clay nanocomposites, Polymer Degradation and Stability (2009), p. 1571-1588.

Saien, et al., Interracial tension of methylbenzene-water in the presence of hydrophilic and hydrophobic alumina nanoparticles at different temperatures, J. Chem Eng. Data, vol. 58, (2013) pp. 436-440.

HYDROPHOBIC SURFACE MODIFIED ALUMINAS FOR POLYMER COMPOSITIONS AND METHOD FOR MAKING THEREOF

THE INVENTION relates to a novel method for producing a hydrophobic alumina, to a new hydrophobic alumina, and to a composition comprising the new hydrophobic alumina and a substrate.

BACKGROUND

Polymers are widely used for several applications, for example, to produce fibers, films or various coating materials. Thermoplastics are the most widely used in industry. Polymers are often used as or in barriers, e.g., films, adhesives, or the like, to improve properties and performance of various materials.

In the field of barrier polymers, complex processes and technologies, not particularly efficient in terms of energy, are applied to achieve resistance towards molecular permeation (e.g., multilayer films or polymer blends are employed).[1]

Materials with ultrahigh oxygen barrier properties over a large humidity range are obtained by combining high oxygen barrier polymers and water sensitive barriers (ethylene vinyl alcohol copolymer) with at least two layers of relatively high hydrophobic polymers (polyethylene, "PE"). Polymer blends can also be used in the field of barrier polymers as the blend(s) can achieve properties that cannot be obtained with a single layer of polymer.

The use of inorganic particles in polymeric materials to improve various properties is well known in the art. For example, clays have been studied to a significant extent as fillers for polymers, as reinforcing agents, and as barrier materials. A great variety of methods examined attest to the fact that the final physical properties and the performance of the materials depend strictly on the manufacturing techniques, the preparation methods, and the possibility to exfoliate the filler material. However, use of mined clays, exfoliated or dispersed to single particles, has become a major technological challenge.[2-5]

The use of mined clays has some disadvantages. This is because they may contain minerals that adsorb a considerable amount of humidity. Even after removing humidity by heating at high temperature, in most cases, the humidity is readily regained at room temperature, making the use of such clays more complicated. Efficient exfoliation of platelets to form fully dispersed, single particle morphologies can be hindered by the fact that clay particles are hydrophilic, and many polymers of interest are hydrophobic (e.g., polyethylene terephthalate "PET", polyethylene "PE", polypropylene "PP", etc.).[1]

There are numerous reports in the literature about improvements and particle treatments with quaternary ammonium surfactants in order to enable processing of clay into polymers. These materials can modify the hydrophilic character of clay particles through a mechanism of electrostatic interaction, and improve the dispersability and wetting in the host polymer. In doing so, they can provide reinforcement, in some cases via crosslinking. However, it is also reported that such ammonium surfactants may decompose during processing in the melt at relatively high temperatures, with negative effects on the durability aspects of the polymer[2,3]

Often the preparation of clay-modified polymers is carried out in the presence of compatibilizers (such as maleic anhydride) and/or a short chain metal stearate, which have properties of water repellence. However, metal stearates behave as lubricants and simply surround the particles without forming a specific chemical bond. Metal stearates and silanes assist in suspending the clay particles with only a small rise in the melt viscosity. However, with nano sized particles only agglomerates are incorporated into the polymer matrix with poor dispersion, and the material behaves as a conventional filler.[4]

The use of mechanical techniques to incorporate particles, without any specific surface modification, has also been described in the prior art. These treatments are rarely used. An example being kaolin, which cannot be surface modified. The prior art teaches[5] that plate-structured kaolin that is prepared through a crusher may improve barrier performance beyond standard latex coatings. Scanning electron microscope (SEM) micrographs of the coating substrate indicate that particles must be present at high concentration in order to achieve the desired properties. Mined minerals containing large size kaolin crystals are reported to be selectively mined and crushed to micron size plate-like particles. The limits achieved to control the thickness of the particles are on the scale of about 100 nm while the size is above 500 nm (too big to be effective), therefore highly inefficient with respect to the volume fraction used.

The high filler volume fraction is expected to enhance the barrier properties, but conversely, deteriorates the polymer mechanical characteristics.

The literature reports the use of hydrated alumina for polymers without modification of its surface.[6] The application relates to polyamide resins being embedded into a particulate for barrier properties. In this process transitional aluminum oxide is obtained by thermal calcination at high temperature, calcination being carried out at a temperature greater than 400° C. The maximum calcination temperature may be less than 1050° C. or 1100° C. These temperatures usually result in a substantial proportion of gamma and theta phase alumina. The process for the preparation of these materials uses seeds, which sometimes are used to control crystal growth. The property of this material is claimed to be derived from the alteration of boehmite with transitional alumina (to avoid forming tight, dense, assemblies of particles). However, it may be argued that the product preparation is made additionally complex by the necessity of calcination, followed by additional drying of the materials again, before addition into polymer. Examples show particles with the smallest crystal size above 50 nm (or "such as at least 75 nm, such as at least 100 nm, or at least about 135 nm"), generically referring to the property of this alumina.

BACKGROUND REFERENCES

[1] Timothy V. Duncan, Applications of nanotechnology in food packaging and food safety: Barrier materials, antimicrobials and sensors, Journal of Colloid and Interface Science 363 (2011) 1-24

[2] M. D. Sanchez-Garcia, Novel PET Nanocomposites of Interest in Food Packaging Applications and Comparative Barrier Performance With Biopolyester Nanocomposites, JOURNAL OF PLASTIC FILM & SHEETING, VOL. 23-APRIL 2007.

[3] By Dintcheva, N. Tz.; Al-Malaika, S.; La Mantia, F. P., Effect of extrusion and photo-oxidation on polyethylene/clay nanocomposites, Polymer Degradation and Stability (2009), 94(9), 1571-1588.

[4] Gupta, Kernmel and Kin, Polymer Nanocomposites handbook, CRC Press.

[5] IMERYS TECHNICAL GUIDE, Barrisurf T M.
[6] D. O. Yener, O. Guiselin, R. Bauer, U.S. Pat. No. 8,575,255, Saint-Gobain Ceramics and Plastics, 2007.

Background references [1]-[6] are incorporated herein by reference for all purposes.

SUMMARY OF THE INVENTION

The present invention aims to produce, by a simple process, new hydrophobic aluminas having surface modified structures distinguished by a low humidity content and very small nanoparticles. These new hydrophobic aluminas can be uniformly dispersed in a substrate, for example polymers.

According to a first aspect of the invention there is provided a method of producing a hydrophobic alumina comprising the steps of:
  i) providing a slurry comprising an alumina compound, the slurry having a pH of above 5.5;
  ii) mixing an organic composition comprising carboxylic acids with long hydrocarbon chains with the slurry to form an acid modified slurry;
  iii) hydrothermally conditioning the acid modified slurry to form a hydrothermally aged slurry; and
  iv) drying the hydrothermally aged slurry.

The alumina compound includes an aluminum oxide hydroxide (AlOOH), a boehmite or a pseudoboehmite, preferably a boehmite. The aluminum oxide hydroxide may be derived from water hydrolysis of an aluminum alkoxide, or from other alumina sources such as a sodium aluminate source, an alum source, or numerous other variations.

More particularly, the alumina compound suitable for the method of the present invention may be obtained from hydrolysis of aluminum alkoxide.

The aluminum oxide hydroxide is made up of different shaped crystals including hexahedral, tablet-like, block-like, plate-like structures, or combinations thereof. It preferably has a plate-like or block-like structure or combinations thereof.

The slurry is preferably an aqueous slurry. In a more preferred embodiment of the invention the aqueous slurry comprising the alumina compound is an intermediate stream of the Ziegler industrial production of AlOOH from the hydrolysis of aluminum alkoxide.

The aqueous slurry preferably has a pH of above 5.5, preferably a pH of 7.0 to 10.0, more preferably a pH of 8.0 to 10.0.

The organic composition comprises a matrix of long chain fatty acids, hydroxy fatty acids, unsaturated or saturated, poly acids (e.g., citric acid), interlinked chains of the above, and esters. The organic composition has a carboxylic acid functional group with long hydrocarbon chains which binds to the surface of the alumina compound.

The organic composition comprises carboxylic acids with hydrocarbon chains having a carbon chain length greater than 10, preferably a carbon chain length between 12 and 24, more preferably 12 and 20 and most preferably 14 and 18.

The method of dispersing inorganics throughout the polymeric materials in the prior art is generally accomplished by extrusion and other mechanical high shear processes. It is not required to utilize such high mechanical energy to produce the positive effects of the present invention. On a small scale, the claimed process can be applied in a vessel provided with an anchor type impeller which can operate at low tip speed velocity. For large scale, the process can be carried out in a vessel equipped with a mechanical impeller at suitable controlled tip speed velocity and provided with suitable internal distributors.

The method steps of the invention are important as the organic composition is first mixed with an aqueous slurry including the alumina compound to form an acid modified slurry, such that the organic composition dissolves. This is followed by a hydrothermal conditioning or aging step which ensures that the organic composition is effectively emulsified with particles of the alumina compound i.e. a hydrothermally aged slurry that contains finely sub-divided alumina particles is obtained.

It is preferred that the aqueous slurry and the acid modified slurry have a pH of 7 and above. In certain instances, a pH of 7 or above 7 is maintained by virtue of the pH of the slurry chosen and the amount of organic composition added to such a slurry. For example, if the organic composition is added in requisite quantities to a slurry of an intermediate stream of the Ziegler industrial production of AlOOH from the hydrolysis of aluminum alkoxide, the pH of the acid modified slurry will remain above 7. In other cases, in order to ensure that the pH of the acid modified slurry is maintained at 7 or above 7, the method of the invention may include a step of adding a basic solution to the acid modified slurry, for example $NH_4OH$. Alternatively, the base can be added to the slurry before the addition of the organic composition.

By following an embodiment of the invention, the alumina compound is added to an aqueous suspension, for example water, to form a room temperature slurry. The room temperature slurry is introduced into a vessel, and a predetermined amount of an organic composition comprising carboxylic acids with hydrocarbon chains as defined by the present invention is added to the slurry. The organic composition can be added to the slurry before the slurry is heated. On the other hand, the slurry can first be heated above ambient temperature, up to a temperature of about 200° C., and then mixed with the organic composition. Those skilled in the art may also find an alternative suitable way to mix the reagents. For example, in a batch process, the organic composition can be added to a pre-heated vessel, and the slurry can be added thereafter, or the organic composition can be added simultaneously with the slurry. It is preferred that the aqueous slurry and the acid modified slurry have a pH of 7 and above. Afterwards, the acid modified slurry undergoes a hydrothermal conditioning treatment to form a hydrothermally aged slurry The hydrothermal conditioning treatment is performed at a temperature between 90° C. to 200° C. The heat can be supplied through an external source (e.g. electrical or via circulating oil in external jacket) or through direct injection of high pressurized steam.

The resultant hydrothermally aged slurry is maintained at the temperature of the hydrothermal conditioning for a period of time that depends mainly on the temperature and agitation. Generally speaking, the duration of such hydrothermal aging can be between 1 hour and 6 hours. During the hydrothermal aging concomitant growth of the alumina crystal particles occurs to provide for specialized morphologies.

At the end of the hydrothermal conditioning or aging, the hydrothermally aged slurry enters a drying chamber where the hydrothermally aged slurry is dried and a hydrophobic alumina powder is obtained.

The hydrothermally aged slurry may be dried in a spray dryer or a contact dryer, operated with nitrogen or air, but other dryers that can operate under appropriate temperature can be used. If drying is carried out with a spray dryer, the atomizer inlet temperature is greater than about 200° C. and the atomizer outlet temperature is about 95° C. to 140° C., preferably 100° C. to 110° C. With a contact dryer where the heat exchange is conducted through a circulating oil externally to the dryer, the temperature 220-230° C. ° of the oil is about 220-230° C. while the outlet temperature of nitrogen is above 100° C., for example about 112-116° C.

As known in the art, the distribution of particle sizes and the bulk density of the powder is fairly constant for a given method of drying. The density can be varied from as little as 0.2 g/cc to as large as 1.0 g/cc.

After drying, a hydrophobic alumina powder is obtained in which the organic composition is anchored to the alumina surface through the Al-carboxylate species. This was verified from the diffuse reflectance infrared fourier transform (DRIFT) spectra, by the appearance of the band at 1580 $cm^{-1}$.

The production of such hydrophobic powders occurs via the formation of hydrophobic Al-carboxylate species on a surface of the alumina crystal particles through the reaction of hydroxyl groups and elimination of surface water. Due to the lipophilic characteristic of the alumina surface after the treatment stage, drying results in substantially low humidity of the powder to zero humidity content.

Due to the method of surface treatment, covalently bonded organic molecules form a surface on top of alumina nano crystal particles with differing properties as compared to a non-treated polar alumina surface. The surface is comparable to that of the low surface energy polymeric systems which are low surface energy materials. The advantage is that the agglomerate strength of the particles is similar to polymer thus it is possible to easily break up the agglomerates and to achieve a uniform dispersion of single nano crystal particles in a polymer.

The hydrophobic alumina powder produced by the method of the present invention has a substantially low humidity content. In particular, the hydrophobic alumina powder has less than 3% free water, preferably less than 2% free water, more preferably less than 1% free water, even more preferably less than 0.5% free water, and most preferably less than 0.4% free water. The free water is measured by Karl Fischer or thermogravimetric analysis (TGA) techniques, both known to a person skilled in the art of the invention.

The hydrophobic alumina powder is observed to have a significant homogeneous surface coated by the organic molecules with remarkable low wettability by water or polar molecules this in turn has a dramatic impact in preventing water re-hydration.

The higher the temperature of the drying process, the more coated are the crystal particles with the Al-carboxylate species, and the lower the humidity of the final powder, and the more hydrophobic are the particles.

According to a second aspect of the invention there is provided a hydrophobic alumina prepared according to the method of the invention.

These new hydrophobic aluminas can have specialized aspect ratios. Such benefits can confer an advantage at high vol. % loadings pertaining to thermal conductivity, mechanical properties (particularly in the case for substantially agglomerate-free dispersions in the polymer), or flame retardancy. Conversely, compositions of polymers and these hydrophobic aluminas in lower vol. % loadings make such polymers particularly resistant to gas permeability for barrier property benefits in films and/or in adhesive layers, while still possessing beneficial physical and mechanical properties.

These characteristics can provide advantages to polymers in terms of both performance and higher efficiency, as explained later herein.

The hydrophobic alumina may be comprised of hexahedral, tablet-like, plate-like, block-like or structures or combinations thereof. Preferably the hydrophobic alumina has a plate-like or block-like structure, or combinations thereof.

The structure of these crystal particles is measured by X-ray diffraction. The structure of crystals is described by sizes derived in directions along lines perpendicular to the planes of the X-ray diffraction patterns by using the Scherrer formula.

For example, crystal size information to describe the crystal habit of the hydrophobic alumina is supplied from X-ray diffraction peaks of planes (200), (020), and (002). The size is derived in the direction perpendicular to the measured diffraction planes.

FIG. 6 is an idealized drawing of a crystal particle. The plane (020) is showed along with the (200), (020) and (002) sizes.

The (020) size is taken as a direct indication of the average thickness of the crystals. An aspect ratio can be derived among the (002) and the (020) planes.

For block like crystals, the aspect ratio is substantially 1.5:1 to 1:1, plate crystals particles may be characterized by aspect ratios higher than 1.5:1 to aspect ratios of about 5:1, ultra small plates have thicknesses of about 3-4 nm.

The microstructure of these crystalline solids is also investigated by transmission electron microscopy (TEM). The information from TEM is coupled with the x-ray experiment results to have a comparison of the anisotropy using Scherrer relation on (020) lines.

The crystal growth can be changed with the use of an organic composition comprising aliphatic carboxylic acid hydrocarbons having a specific chain length of greater than 10 binding to a surface of the alumina compound for example to manipulate the morphologies of the crystals. It is known that boehmite crystal particles bear hydroxyl groups on their surfaces and thus tend to form bonds with the carboxylic acid. The organic composition is characterized by highly hydrophobic molecules and tends to sterically stabilize the crystal by attaching to the hydroxyl groups on the surface of the boehmite crystal particle via the carboxylic moiety. This treatment aims to modify in particular the basal faces of the crystals (020) because these surfaces present less steric hindrance for assembly of the organic molecules. The chemistry and mechanism behind this technique is to obtain new crystallite morphologies. The method of the present invention makes it possible to change the crystal particle size with ligands that link to the surface of the basal faces and thus modify the interfacial surface energy and wettability with water.

When properly controlled, this method can be used to obtain specialized morphologies. Altering surfaces of alumina with a hydrophobic ligand that makes growth conditions more favorable in specific directions is the advantage of the process of the present invention.

During the synthesis process, with hydrothermal treatment conditions of the slurry at temperatures preferentially above 100° C., the width and the length of crystals will increase in relation to the thickness, such that increased plate-like crystallites are formed retaining their final hydrophobic properties.

These new hydrophobic aluminas can be particularly advantageous for forming compositions with substrates such as polymers, especially those referred to as non-polar polymers.

According to a third aspect of the invention there is provided a composition including a hydrophobic alumina prepared according to the method of the invention and a substrate, the hydrophobic alumina being dispersed in the substrate.

The substrate comprises polymer, paraffin or oil, more preferably polymer or paraffin.

The polymer may include a low molecular weight polymer, or a wax.

The particles of the hydrophobic alumina can be dispersed in the substrate from 3.5 nano meters to 1000 nano meters, more preferably 3.5 nano meters to 600 nano meters and most preferably from 3.5 to 75 nano meters, where the single crystal size preferably ranges from 3.5 nm to 75 nm. By particles is meant either a single crystal and/or an aggregate of single crystals, for example two single crystals of 4 nm make up a 8 nm aggregate. This dispersibility is measured by SEM technique for solids, e.g. polymers, and dynamic light scattering for liquids, e.g. oil.

The new compositions of the present invention can confer an advantage at high vol. % loadings pertaining to thermal conductivity, mechanical properties (particularly in the case for substantially agglomerate-free dispersions in the polymer), or flame retardancy. Conversely, compositions of polymers and these hydrophobic aluminas in lower vol. % loadings make such polymers particularly resistant to gas permeability for barrier property benefits in films and/or in adhesive layers, while still possessing beneficial physical and mechanical properties.

The hydrophobic alumina can be used in melt compounding processes because the hydrophobic alumina is thermally stable at typical temperatures used in these processes. It can be used in a carrier such as a low molecular weight polymer, a wax, or a mineral oil, because it can be dispersed in these systems. Examples of suitable polymers or carriers are High Density Polyethylene "HDPE", Low Density Polyethylene "LDPE", Polypropylene "PP", PET, and waxes, for example Fisher Tropsch "FT" waxes.

As the hydrophobic aluminas do not degrade, they are advantageous over other modifiers that decompose at low temperature (e.g., some silanes), and not obvious in polymer processing. The product of the present invention is thermally stable under a broad range of compounding conditions.

In the context of the current invention, a dispersion is a "system of dispersed particles suspended in a solid, liquid, or gas" or "small particles distributed in a fluid".

The invention will now be described with reference to the following Figures and non-limiting example.

DETAILED DESCRIPTION OF THE PREFERRED EMBODIMENTS

Example 1

This example is a preparation of the hydrophobic alumina of the present invention, specifically a hydrophobic boehmite, using an organic composition including a carboxylic acid having a carbon chain of 18. A hydrothermally treated boehmite slurry from a hydrolysis process of aluminum alkoxide (295 lbs.) at pH value of about 9, was mixed with 4.1 lb. of the organic composition including a carboxylic acid having a carbon chain of 18 (17% wt.) to form an acid modified slurry. The acid modified slurry was hydrothermally treated at 105° C. for 2 hours under low agitation. After 2 hours of mixing a low viscosity hydrothermally treated slurry that contained finely sub-divided particles was obtained. The hydrothermally treated slurry (having a pH of between 7 and 7.5) was cooled and pumped at room temperature to a contact dryer operated under nitrogen, which had an external circulating oil jacket that operated at 240° C. and where the temperature of the gas exiting the dryer was 115° C.

A hydrophobic alumina was obtained with a bulk density of 0.86 g/cc.

The hydrophobic alumina included long hydrophobic carboxylate molecules on a surface of alumina crystal particles. This is indicative of the improved compatibility with hydrophobic polymers.

Figure 1:
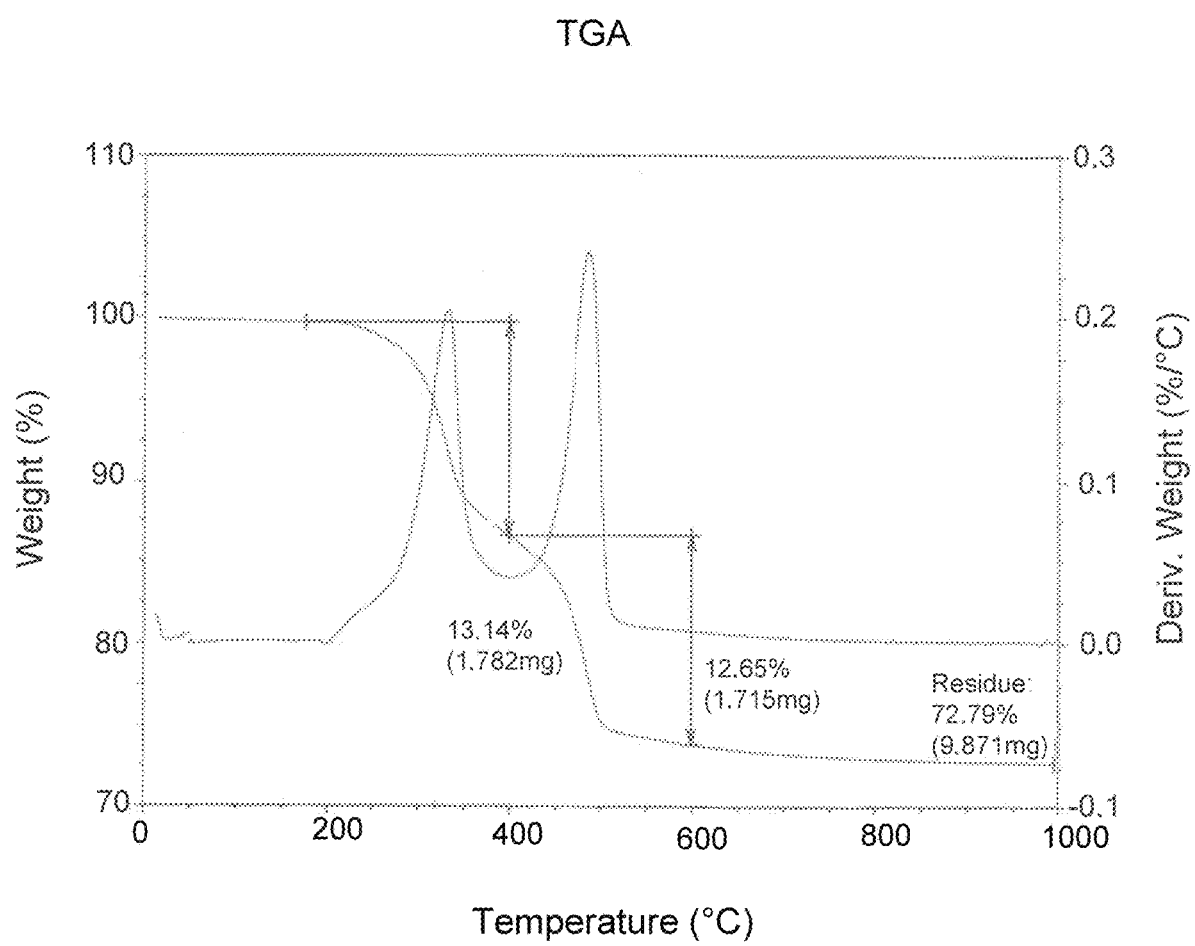
FIG. 1 is a TGA/DTA analysis of a new hydrophobic alumina as per Example 1.
Figure 2:
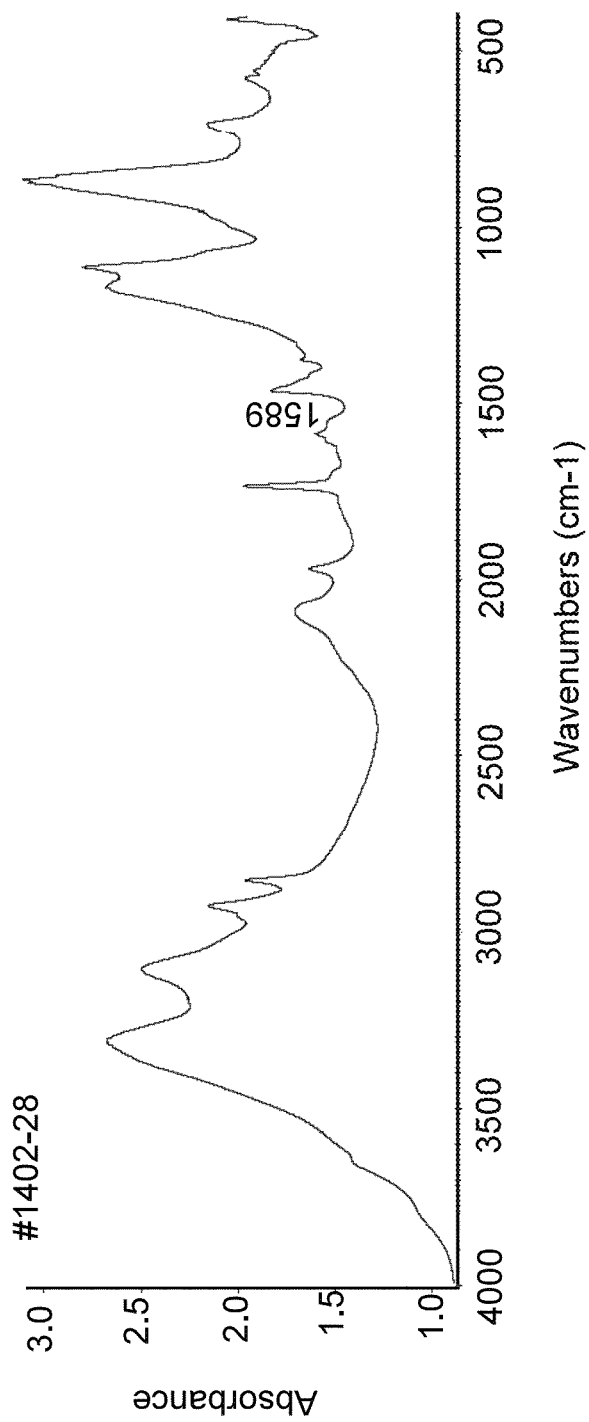
FIG. 2 is a DRIFT spectra of the hydrophobic alumina in Example 1 with the characteristic Al-carboxylate signal.

FIG. 1 is the TGA/DTA analysis of the hydrophobic alumina powder. FIG. 1 shows that there is less than 0.5% of free water on the hydrophobic alumina powder. As per FIG. 2, the crystal particles by X-ray are characterised by a thickness of 35 nm (020) and length of 37 nm (002).

Figure 3:
FIG. 3 is an SEM that shows the structure of HDPE (high density polyethylene) film that contains the hydrophobic alumina of Example 1 dispersed to a dimension comparable to single crystal particles.

The particles of the hydrophobic alumina were dispersed in HDPE to a particle size of 45 nano meters. The particle size was detected by SEM and it is essentially consistent with the dimension of a single crystal that was determined by X-ray diffraction. HDPE was compounded with the hydrophobic alumina powder of Example 1 in a Brabender mixer at 150° C., 60 rpm for 15 minutes. FIG. 3 is an SEM that shows the structure of the HDPE film containing the hydrophobic alumina made of boehmite crystal particles which were homogeneously dispersed to a dimension comparable to single crystal particles.

Figure 4:
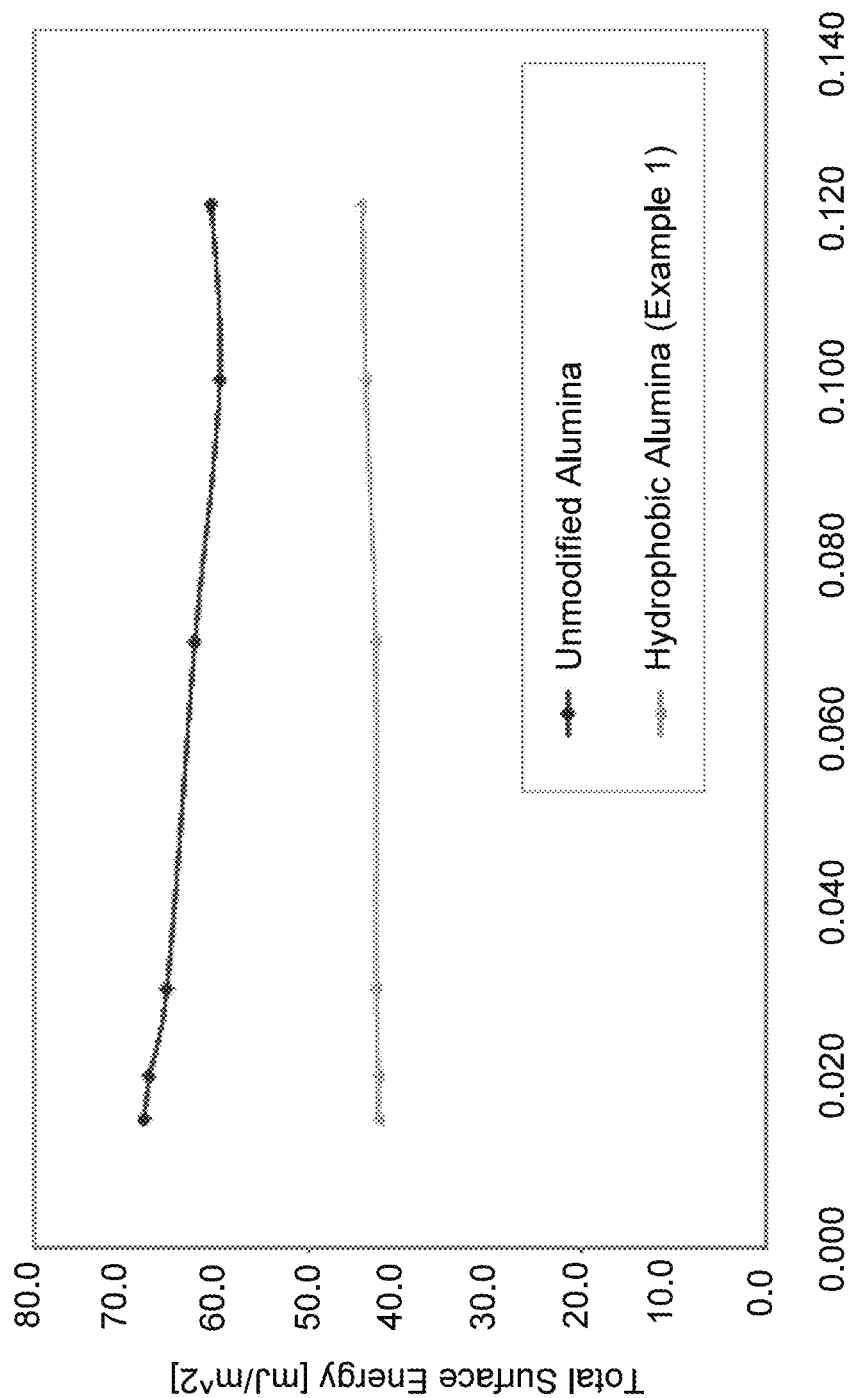
FIG. 4 is a graph showing surface energy of the hydrophobic alumina of Example 1 vs an unmodified powder.
Figure 5:
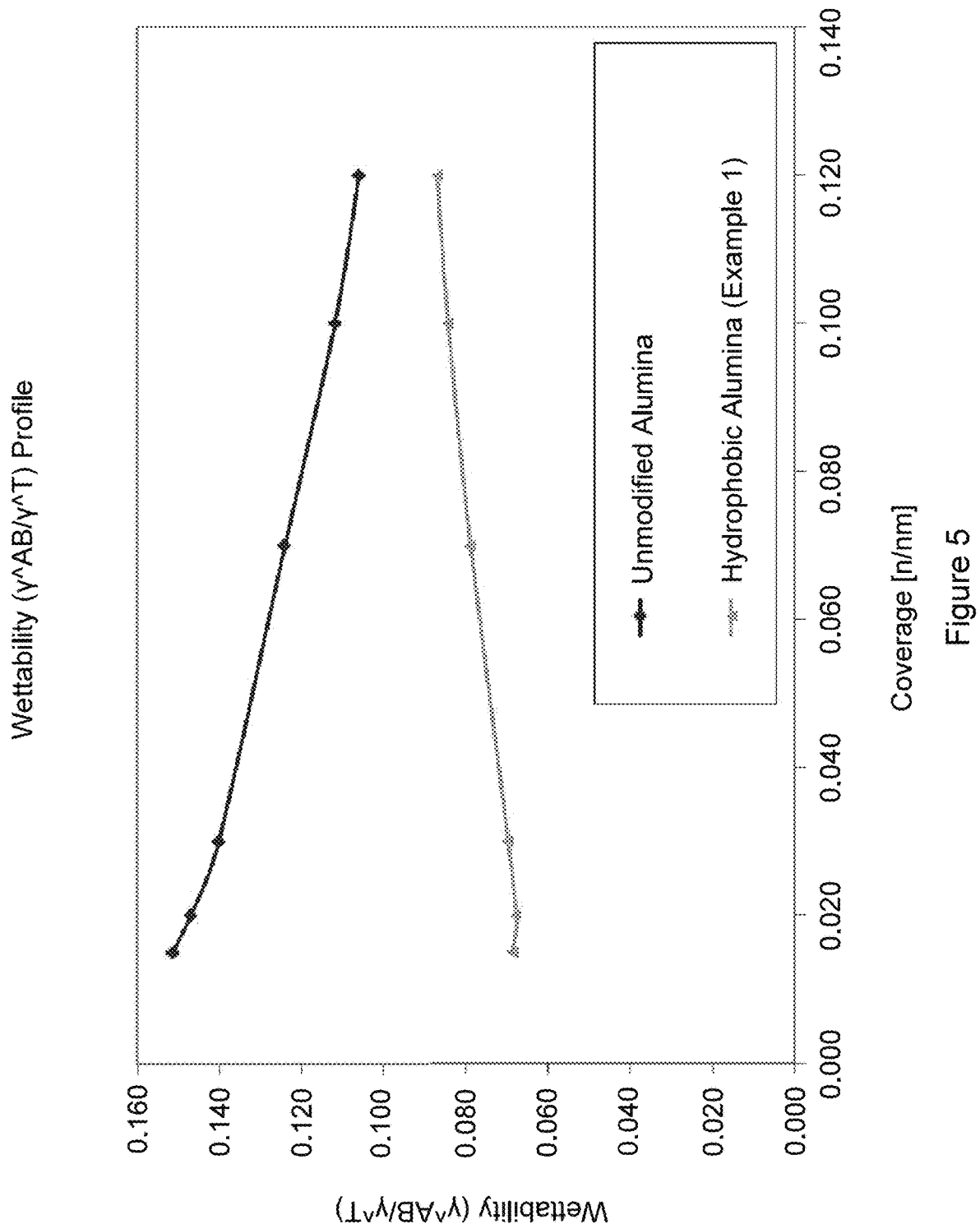
FIG. 5 is a graph showing the wettability of the hydrophobic alumina of Example 1 vs an unmodified alumina.
Figure 6:
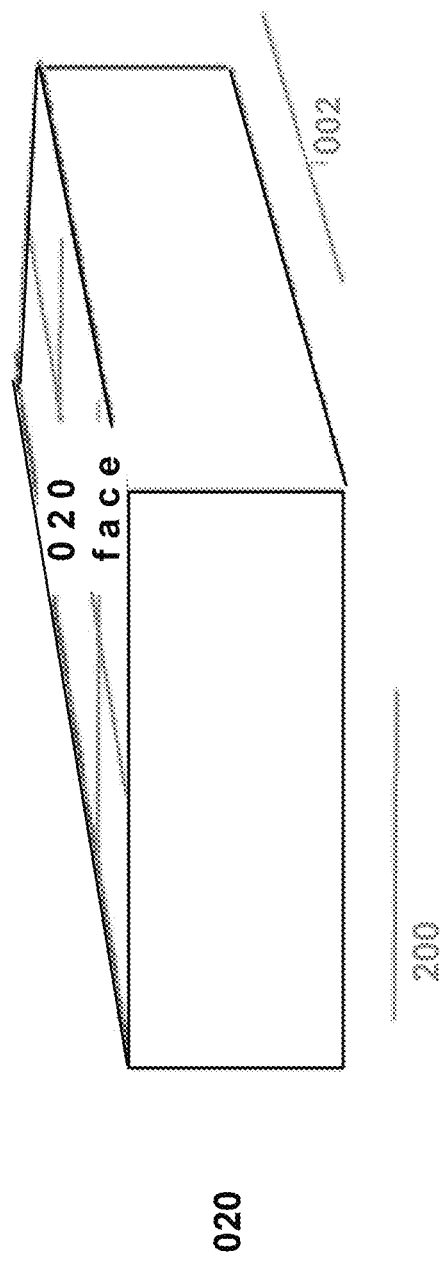
FIG. 6 is an idealized drawing of a crystal particle.

The Inverse Gas Chromatography technique was then applied to investigate powder surface energies (FIG. 4) and wettability properties of the hydrophobic alumina powder (FIG. 5).

The examined powder was placed in the chromatographic column. Carefully selected probe molecules with known physicochemical properties were injected into the column. The retention data obtained enabled calculation of values describing surface properties.

The total surface energy was evaluated through the contribution of two components:

$$\gamma^T = \gamma^D + \gamma^{AB}$$

$\gamma^D$ is the dispersive component that is related to the non-polar property of the surface, $\gamma^{AB}$ is the polar contribution of the surface.

The dispersive component of total surface energy was obtained by measuring the adsorption with alkane probe molecules having increasing C-chain length: hexane, heptane, octane and nonane.

The polar component of the total surface energy was obtained by the use of polar probe molecules: acetonitrile, acetone, ethanol, ethyl acetate and dichloromethane.

By taking the polar component divided by the total surface energy, $\gamma^{AB}/\gamma^T$, the wettability profile of the samples was determined. A non-polar nature of the surface is described by a low wettability profile.

Analysis was carried out by passing different amounts of probe molecules into a column to achieve different surface coverages.

Comparing the hydrophobic alumina powder to untreated boehmite, it was found that the hydrophobic alumina modified with the organic modifier of Example 1 is significantly lower in surface energy, confirming that the modification has a significant impact. The low surface energy value also corroborates the lower affinity for polar substances. This is also highlighted by the lower wettability profile, thus showing this sample is compatible with non-polar systems. The lipophilic character of the hydrophobic alumina is verified in a typical non polar liquid, an aliphatic mineral oil having a viscosity of 19 cP at 20° C. The powder was mixed at 10 phr with 90 phr of oil. The resulting dispersion was centrifuged and the solid residue on the bottom of the centrifuge tube was weighed after rinsing in hexane and drying at 110° C. The % wt. of particles dispersed calculated by difference with respect to the total amount of powder was 96% wt.

Comparative Example 1

A comparative example using a fatty acid composition having a carbon chain of equal to 8 was carried out. 2500 grams of boehmite solution from a hydrolysis process of aluminum alkoxide at pH value of about 9, was mixed with 180 grams of water. Subsequently 18 grams of octanoic acid were introduced to obtain a number of moles on boehmite in the range of that applied in the Example 1. Then an ammonia solution at 30-33% wt, in an amount equal to 9.5 grams, was added under stirring. The resulting slurry was kept at constant agitation at 105° C. for 2 hours. The hydrothermally aged slurry was cooled at room temperature, the pH value of the hydrothermally aged slurry was 8.6. The hydrothermally aged slurry was pumped into a spray atomizer that operates with N2 flow to obtain a dry powder. The powder was added to an aliphatic oil under the same conditions of Example 1. During mixing time the viscosity increases considerably until the system exhibited no flow. The test was stopped as the powder was not dispersible in oil.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

The invention claimed is:

1. A hydrophobic alumina compound comprising:
an alumina compound including an aluminum oxide hydroxide (AlOOH), a boehmite, or a pseudoboehmite, said alumina compound having hydrocarbon chains having a carbon chain length of between 12 and 24 carbon atoms formed on the surface thereof;
the hydrophobic alumina having a free water content of less than 2.00%.

2. The hydrophobic alumina compound of claim 1, wherein the hydrophobic alumina compound has a final free water content of less than 1.00%.

3. The hydrophobic alumina compound of claim 1, wherein the hydrophobic alumina compound has a final free water content of less than 0.5%.

4. The hydrophobic alumina compound of claim 1, wherein the hydrocarbon chains are covalently bonded to the alumina compound.

5. A composition comprising a hydrophobic alumina compound as claimed in claim 1 and a substrate, the hydrophobic alumina compound being dispersed in the substrate.

6. The composition as claimed in claim 5, wherein the substrate is a polymer or a paraffin.

7. The composition as claimed in claim 6, wherein the polymer includes a low molecular weight polymer or a wax, wherein said low molecular weight polymer is selected from the group consisting of high density polyethylene, low density polyethylene, polypropylene, and polyethylene terephthalate.

8. The composition as claimed in claim 1, wherein particles of the hydrophobic alumina compound are dispersed in the substrate to particle sizes of 3.5 nano meters to 75 nano meters.

9. The composition as claimed in claim 8, wherein particles of the hydrophobic alumina compound are dispersed in the substrate to particle sizes of 3.5 nano meters to 45 nano meters.

\* \* \* \* \*